US008565918B2

(12) United States Patent
Abdallah et al.

(10) Patent No.: US 8,565,918 B2
(45) Date of Patent: Oct. 22, 2013

(54) TORQUE CONTROL OF UNDERACTUATED TENDON-DRIVEN ROBOTIC FINGERS

(75) Inventors: Muhammad E. Abdallah, Houston, TX (US); Chris A. Ihrke, Hartland, MI (US); Matthew J. Reiland, Oxford, MI (US); Charles W. Wampler, II, Birmingham, MI (US); Myron A. Diftler, Houston, TX (US); Robert Platt, Cambridge, MA (US); Lyndon Bridgwater, Houston, TX (US)

(73) Assignees: GM Global Technology Operations LLC, Detroit, MI (US); The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 716 days.

(21) Appl. No.: 12/720,727

(22) Filed: Mar. 10, 2010

(65) Prior Publication Data

US 2010/0280662 A1 Nov. 4, 2010

Related U.S. Application Data

(60) Provisional application No. 61/174,316, filed on Apr. 30, 2009.

(51) Int. Cl.
*G06F 19/00* (2011.01)

(52) U.S. Cl.
USPC ............ 700/245; 700/253; 700/258; 700/262

(58) Field of Classification Search
None
See application file for complete search history.

(56) References Cited

U.S. PATENT DOCUMENTS

| | | | | |
|---|---|---|---|---|
| 3,694,021 | A * | 9/1972 | Mullen | 294/106 |
| 4,246,661 | A * | 1/1981 | Pinson | 623/25 |
| 4,865,376 | A * | 9/1989 | Leaver et al. | 294/111 |
| 4,921,293 | A * | 5/1990 | Ruoff et al. | 294/111 |
| 4,957,320 | A * | 9/1990 | Ulrich | 294/106 |
| 5,062,673 | A * | 11/1991 | Mimura | 294/111 |
| 5,133,216 | A * | 7/1992 | Bridges | 73/862.321 |
| 5,200,679 | A * | 4/1993 | Graham | 318/568.16 |
| 6,247,738 | B1 * | 6/2001 | Winkel et al. | 294/111 |
| 6,668,678 | B1 * | 12/2003 | Baba et al. | 74/490.04 |
| 6,918,622 | B2 * | 7/2005 | Kim et al. | 294/106 |
| 7,221,120 | B2 * | 5/2007 | Tadano | 318/567 |
| 8,052,185 | B2 * | 11/2011 | Madhani | 294/106 |

OTHER PUBLICATIONS

S. Hirose et al., The Development of Soft Gripper for the Versatile Robot Hand, Mechanism and Machine Theory, 1978, vol. 13, pp. 351-359, Pergamon Press, Great Britain.

(Continued)

*Primary Examiner* — Bhavesh V Amin
(74) *Attorney, Agent, or Firm* — Quinn Law Group, PLLC

(57) ABSTRACT

A robotic system includes a robot having a total number of degrees of freedom (DOF) equal to at least n, an underactuated tendon-driven finger driven by n tendons and n DOF, the finger having at least two joints, being characterized by an asymmetrical joint radius in one embodiment. A controller is in communication with the robot, and controls actuation of the tendon-driven finger using force control. Operating the finger with force control on the tendons, rather than position control, eliminates the unconstrained slack-space that would have otherwise existed. The controller may utilize the asymmetrical joint radii to independently command joint torques. A method of controlling the finger includes commanding either independent or parameterized joint torques to the controller to actuate the fingers via force control on the tendons.

3 Claims, 2 Drawing Sheets

(56) References Cited

OTHER PUBLICATIONS

A. M. Dollar et al., Joint Coupling Design of Underactuated Grippers, DETC2006-99645, Proceedings of IDETC/CIE (2006), ASME 2006 International Design Engineering Technical Conferences & Computers and Information in Engineering Conference, Sep. 10-13, 2006, Philadelphia, PA, USA.

* cited by examiner

TORQUE CONTROL OF UNDERACTUATED TENDON-DRIVEN ROBOTIC FINGERS

CROSS-REFERENCE TO RELATED APPLICATIONS

The present application claims the benefit of and priority to U.S. Provisional Application No. 61/174,316 filed on Apr. 30, 2009.

STATEMENT REGARDING FEDERALLY SPONSORED RESEARCH OR DEVELOPMENT

This invention was made with government support under NASA Space Act Agreement number SAA-AT-07-003. The government may have certain rights in the invention.

TECHNICAL FIELD

The present invention relates to the structure and control of a tendon-driven robotic finger.

BACKGROUND OF THE INVENTION

Robots are automated devices able to manipulate objects using a series of links, which in turn are interconnected via one or more robotic joints. Each joint in a typical robot represents at least one independent control variable, i.e., a degree of freedom (DOF). End-effectors such as hands, fingers, or thumbs are ultimately actuated to perform a task at hand, e.g., grasping a work tool or an object. Therefore, precise motion control of the robot may be organized by the level of task specification, including object, end-effector and joint-level control. Collectively, the various control levels achieve the required robotic mobility, dexterity, and work task-related functionality.

Tendon transmission systems in particular are often used in robotic systems having relatively high DOF robotic hands, largely due to limited packaging space. Since tendons can only transmit forces in tension, i.e., in pull-pull arrangements, the number of actuators must exceed the DOF to achieve fully determined control of a given robotic finger. The finger needs only one tendon more than the number of DOF, known as an n+1 arrangement. If arranged correctly, the n+1 tendons can independently control the n DOF while always maintaining positive tensions. In this sense, an n DOF finger with only n tendons is underactuated, and the finger posture is underdetermined. This situation creates a null-space within which the finger posture is uncontrolled. In other words, the finger cannot hold a desired position and will flop in the null-space. However, having a reduced number of actuators can be an advantage. Space or power limitations can be significant in high DOF robotic hands. Each extra actuator and tendon transmission system greatly increases the demand on space and maintenance requirements.

SUMMARY OF THE INVENTION

Accordingly, a robotic system is provided herein having a tendon-driven finger with n degrees of freedom (DOF) that can be operated with n or fewer tendons. Such a system may enable an efficient means for providing inherently-compliant secondary grasping fingers in a dexterous robotic hand with a reduced number of actuators. The reduced number of actuators and transmissions conserve limited packaging space and reduce maintenance requirements. The present invention provides an underactuated tendon-driven finger with n or fewer tendons that can be operated using force control rather than position control, with effective performance, and a control method thereof. Desired joint torques can be commanded to the robotic finger in a reduced parameter space, without the problem of a null-space flop of the finger, as understood in the art and noted above. The torque will either push the finger to the joint limits or wrap it around external objects.

Additionally, in one embodiment asymmetric joint radii are introduced to the robotic finger to allow for the joint torques to be independently commanded within a range of solutions. When included in a tendon-driven finger design, asymmetric joint radii allow the system to become fully determined within a space or range of possible solutions. Although the finger remains underdetermined under position control, the finger becomes fully determined under force control. Therefore, by employing force control instead of position control, an underactuated tendon-driven finger can be controlled with good functionality, and with a reduced number of tendons and actuators. As such, the finger can be provided at a relatively lower cost and provide an advantage in space constrained applications.

In particular, a robotic system is provided herein having a robot with a total number of degrees of freedom (DOF) equal to at least n, and an underactuated tendon-driven finger having n DOF driven by n or fewer tendons. The finger has at least two joints, which may be characterized by an asymmetrical joint radius or radii in one embodiment. The system also includes a controller and a plurality of sensors for measuring tensions in each tendon, and for feeding these measured tensions to the controller. The controller is in electrical communication with the robot, and the sensors are in-line with the various tendons.

The controller is adapted for controlling an actuation of the tendon-driven finger via at least one actuator, e.g., a joint motor and pulley, etc., using force control, to regulate tension values on the tendons. The controller converts commanded joint torques into appropriate calculated tensions, using feedback in the form of the measured tensions, and controls the actuator(s) to achieve the calculated tensions on the tendons. This eliminates an unconstrained slack space that would otherwise exist in controlling only a position of the tendons. When asymmetric joint radii are introduced, the controller utilizes the asymmetrical joint radii to independently command joint torques for the joints.

An underactuated tendon-driven finger is also provided for use within the robotic system noted above. The finger has n or fewer tendons, n DOF, and at least two joints, with the finger characterized by an asymmetrical joint radius configuration in one embodiment. The asymmetrical joint radius, when present, is useable by the controller to independently command joint torques for the joints, thereby eliminating a null-space flop of the tendon-driven finger.

A method of controlling the underactuated tendon-driven finger is also provided using force control and tension sensors, and includes independently commanding joint torques for the at least two joints via the controller.

The above features and other features and advantages of the present invention are readily apparent from the following detailed description of the best modes for carrying out the invention when taken in connection with the accompanying drawings.

DESCRIPTION OF THE PREFERRED EMBODIMENT

Figure 1:
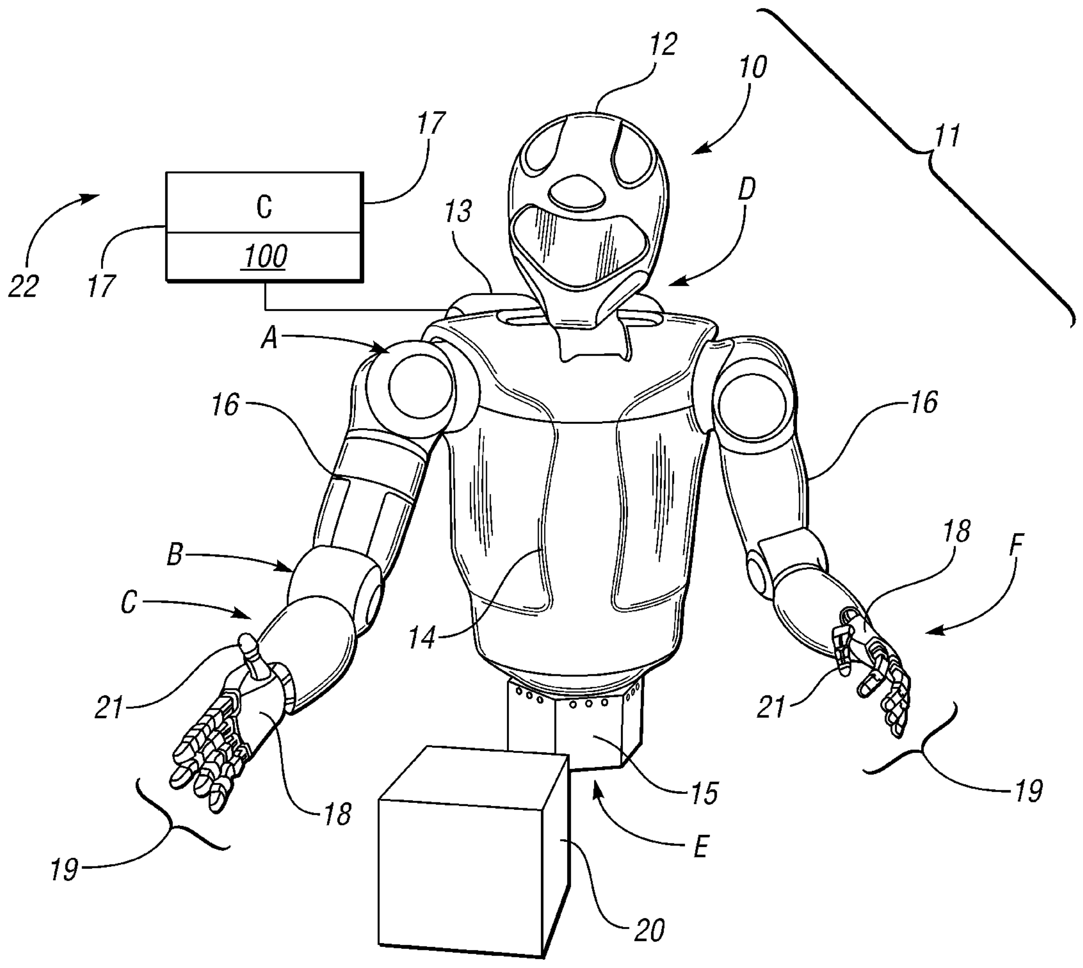
FIG. 1 is a schematic illustration of a robotic system in accordance with the invention.

Referring to the drawings, wherein like reference numbers refer to the same or similar components throughout the several views, and beginning with FIG. 1, a robotic system 11 is shown having a robot 10, e.g., a dexterous humanoid-type robot as shown or any part thereof, that is controlled via a control system or controller (C) 22. The controller 22 is electrically connected to the robot 10, and is adapted with an algorithm 100 for controlling the various manipulators of the robot 10, including one or more tendon-driven fingers 19 as described in detail below with reference to FIGS. 2 and 3. Some of the fingers 19 are underactuated as described herein, and some are fully actuated, with the underactuated fingers assisting the fully actuated fingers in grasping an object 20. The present invention controls the underactuated fingers using tension sensors as set forth below, via force control, and in some embodiments using asymmetric joint radii. An unconstrained slack space that would otherwise exist using position control is eliminated, as set forth in detail below.

The robot 10 is adapted to perform one or more automated tasks with multiple degrees of freedom (DOF), and to perform other interactive tasks or control other integrated system components, e.g., clamping, lighting, relays, etc. According to one embodiment, the robot 10 is configured as a humanoid robot as shown, with over 42 DOF, although other robot designs may also be used having fewer DOF, and/or having only a hand 18, without departing from the intended scope of the invention. The robot 10 of FIG. 1 has a plurality of independently and interdependently-moveable manipulators, e.g., the hands 18, fingers 19, thumbs 21, etc., including various robotic joints. The joints may include, but are not necessarily limited to, a shoulder joint, the position of which is generally indicated by arrow A, an elbow joint (arrow B), a wrist joint (arrow C), a neck joint (arrow D), and a waist joint (arrow E), as well as the finger joints (arrow F) between the phalanges of each robotic finger.

Each robotic joint may have one or more DOF, which varies depending on task complexity. Each robotic joint may contain and may be internally driven by one or more actuators 90 (see FIG. 2), e.g., joint motors, linear actuators, rotary actuators, and the like. The robot 10 may include human-like components such as a head 12, a torso 14, a waist 15, and arms 16, as well as the hands 18, fingers 19, and thumbs 21, with the various joints noted above being disposed within or between these components. The robot 10 may also include a task-suitable fixture or base (not shown) such as legs, treads, or another moveable or fixed base depending on the particular application or intended use of the robot. A power supply 13 may be integrally mounted to the robot 10, e.g., a rechargeable battery pack carried or worn on the back of the torso 14 or another suitable energy supply, or which may be attached remotely through a tethering cable, to provide sufficient electrical energy to the various joints for movement of the same.

The controller 22 provides precise motion control of the robot 10, including control over the fine and gross movements needed for manipulating an object 20 via the fingers 19 as noted above. That is, object 20 may be grasped using the fingers 19 of one or more hands 18. The controller 22 is able to independently control each robotic joint of the fingers 19 and other integrated system components in isolation from the other joints and system components, as well as to interdependently control a number of the joints to fully coordinate the actions of the multiple joints in performing a relatively complex work task.

Still referring to FIG. 1, the controller 22 may include a server or a host machine 17 configured as a distributed or a central control module, and having such control modules and capabilities as might be necessary to execute all required control functionality of the robot 10 in the desired manner. Controller 22 may include multiple digital computers or data processing devices each having one or more microprocessors or central processing units (CPU), read only memory (ROM), random access memory (RAM), erasable electrically-programmable read only memory (EEPROM), a high-speed clock, analog-to-digital (A/D) circuitry, digital-to-analog (D/A) circuitry, and any required input/output (I/O) circuitry and devices, as well as signal conditioning and buffer electronics. Individual control algorithms resident in the controller 22 or readily accessible thereby, such as algorithm 100, may be stored in ROM and automatically executed at one or more different control levels to provide the respective control functionality.

Figure 2:
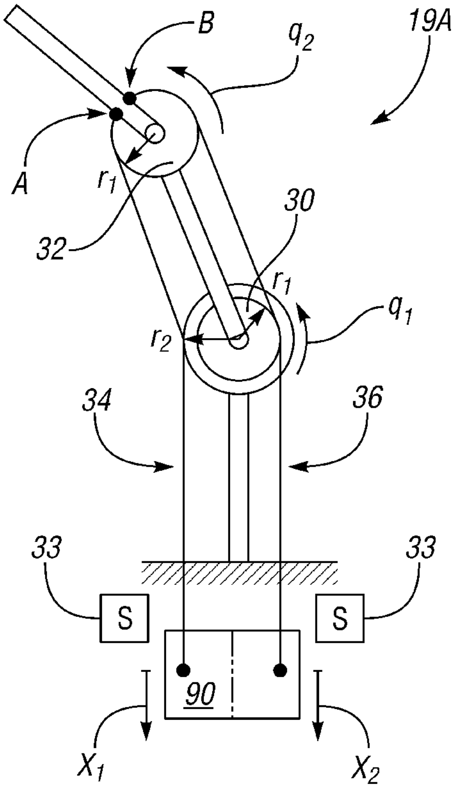
FIG. 2 is a schematic representation of a secondary tendon-driven finger usable with the robot shown in FIG. 1.

Referring to FIG. 2, some of the fingers 19 of FIG. 1 may be configured as secondary fingers, as will be understood in the art. Whereas primary fingers need to be fully actuated and fully controllable, a secondary finger, such as finger 19A shown in FIG. 2, simply needs to flexibly grip objects with a variable strength. Hence, one DOF is sufficient to either specify the grip strength or to fully extend the finger. Notably, finger 19A is underactuated and can only be controlled with force control; it cannot hold a position. The commanded joint torques means finger 19A will either come to rest against its joint limits or wrap around an external object with joint torques scaled by a single parameter. According to one embodiment, by introducing asymmetric joint radii to the finger 19A and employing force control as explained below, an underactuated secondary finger 19A can be fully controlled.

Finger 19A may be used with a robotic hand, e.g., the hands 18 shown in FIG. 1, to grasp an object, whether as a part of a highly complex humanoid robot or as part of a less complex robotic system. Hand 18 of FIG. 1 may have multiple underactuated fingers 19A, with the tendons 34, 36 thereof each either having a dedicated actuator 90, or sharing one actuator 90 to provide shared actuation, with the controller 22 of FIG. 1 commanding joint torques as needed, and as allowed by the shared actuation.

Within the scope of the invention, the finger 19A has n joints and n tendons. Finger 19A includes joints 30, 32 and tendons 34, 36. Finger 19A as illustrated in FIG. 2 has two DOF, therefore n=2 and the number of tendons 34, 36, i.e., two, is equal to n, i.e., the DOF. Therefore, control of finger 19A is underdetermined, and tendons 34, 36 are underactuated, as those terms are used herein. Tension sensors (S) 33 are positioned in the path of the tendons 34, 36, e.g., in the finger 19A, hand 18, forearm, etc., and adapted for measuring and feeding back tensions, i.e., magnitude and direction, on each tendon 34, 36 to the controller 22 of FIG. 1. The controller 22 applies logic to determine calculated tensions having appropriate values, e.g., non-negative values.

Joints 30, 32 are characterized by their respective angles $q_1$ and $q_2$. Tendons 34, 36 are each characterized by a respective position x, represented in FIG. 2 as $x_1$ and $x_2$. Tendons 34, 36 terminate on the second joint 32 at points A and B, respectively. All joint radii are constant and equal to $r_1$, with the one exception labeled as $r_2$, establishing an asymmetric joint radius. A quasi-static analysis of finger 19A reveals the following relation between joint torques (τ, corresponding to q in FIG. 2) and tendon tensions (f, corresponding to x FIG. 2):

$$\tau = Rf \quad (1)$$

$$R = \begin{bmatrix} r_2 & -r_1 \\ r_1 & -r_1 \end{bmatrix} \quad (2)$$

R in equation (2) is the tendon map matrix for finger 19A, with at least one all-positive row and at least one all-negative row. This relation assumes insignificant friction and no external forces. Due to the asymmetric joint radii, R is a nonsingular matrix. Hence, independent joint torques can be achieved. Since the tendons 34, 36 can only operate in tension, there is a limited space of valid solutions for τ.

Throughout the present application, an asymmetrical design is one resulting in a matrix R with a full row-rank, as understood in the art. Suppose that the position of the tendons 34, 36 is to be controlled instead of their tensions. Through the standard virtual work argument, the joint and actuator motion can be related through a parallel relationship to the equation τ=Rf as $\dot{x}=R^T\dot{q}$, where q is the set of joint angles. This equation is true only if the tendons 34, 36 remain taut. It is more accurate to introduce an intermediate variable y that represents the tendon extension that would keep the tendons taut, while x is the actual extension of the tendon actuators. Then, starting from any configuration in which the tendons 34, 36 are initially taut, i.e., x=y, the following holds true:

$$\dot{x} \le \dot{y} = R^T\dot{q}.$$

By this notation, we mean that the inequality holds for each row of the matrix expression.

Even if the actuators are held stationary, $\dot{x}=0$, the finger 19A can move with $\dot{y}$ in the positive quadrant: $\dot{y}_1 \ge 0$, $\dot{y}_2 \ge 0$. Such motions enter the slack region, i.e., a bounded region in which the finger 19A may move freely even though the actuators are held stationary. The slack region is described by inequalities at the position level. The inequalities appear whose boundary lines are the tendon constraint lines 34A, 36A of FIGS. 3A and 3B as explained below. Assume all quantities are measured from an initial position x=y=q=0 in which the tendons 34, 36 are taut. Assuming inelastic tendons, the joint motion is constrained by the length of the tendons:

$$x \le y = R^T q.$$

In particular, for the finger 19A in FIG. 2 we have $x_1 \le r_1q_1 + r_3q_2$ and $x_2 \le -r_2q_1 - r_4q_2$. In general, the union of these inequalities consists of a wedge that defines the slack region. Hence, the slack region or slack space refers to the region in which the finger can freely flop even though the pulleys or other actuators are held stationary.

Figure 3A:
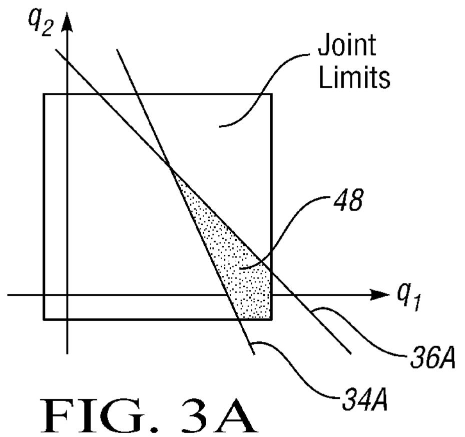
FIG. 3A is a schematic illustration of a slack space bound by two constraints and joint limits.
Figure 3B:
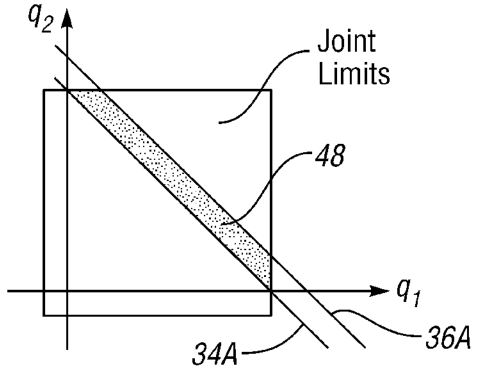
FIG. 3B is a schematic illustration of the slack space of FIG. 3A as it appears in a symmetric design.

Referring to FIG. 3A, in the interior of a slack region 48 the tendons 34, 36 lose tension, while on either boundary, one tendon 34 is taut while the other tendon 36 is slack. Referring to FIG. 3B, for symmetric designs the constraints become parallel. In this case, the tendons 34, 36 perfectly oppose each other, so they can be drawn taut, at which point their constraints in joint space collapse onto each other into a single line that matches the null-space of $R^T$. Tendon constraint lines 34A, 36A represent such boundaries. Even though the tendons 34, 36 will remain taut, they cannot resist motion along this line.

Hence, this underactuated finger 19A is underdetermined in position control while fully determined in force control, within a range of feasible torques. Although theoretically the system of finger 19A is fully determined in force control, not all joint torques are possible due to the unidirectional nature of tendons 34, 36, necessitating a determination of the space of valid joint torques.

Consider again FIG. 3A, i.e., the unsymmetric design. The tendon constraint lines 34A and 36A represent the motion limits imposed by the tendons 34, 36, respectively. The tendon constraints can be translated by moving the tendon actuator. By pulling on the tendons 34A, 36A, the slack region 48 can be shrunk first to a small triangle, then eventually to a single point on the joint limit boundary. A single point means that the joints cannot move, so the position of the finger 19A is stabilized. In contrast, pulling on the tendons 34, 36 of the symmetric design translates the tendon constraints 34A and 36A until they coincide. In that case, the slack region 48 is reduced to a line segment extending from one edge of the joint limit box to the other. Motion along this line segment is the "finger flop."

The only places where this line segment shrinks to a point is when the tendons drive the finger 19A to full extension, i.e., the upper-right corner of the joint limit box, are to full flexion (lower-left corner of the joint limit box). One sees then, that in the illustrated embodiment, the asymmetric design allows position control of the finger 19A anywhere along the whole lower edge or along the whole right edge of the joint limit box. Thus, a repeatable trajectory between full flexion and full extension can be obtained all the while maintaining a slack region that is a single point. In the illustrated embodiment, from full extension, this trajectory first bends the base joint q1 to its upper limit, then bends the distal joint q2 to its upper limit, arriving at full flexion.

FIGS. 3A and 3B do not show the constraints that would be presented by an object within the reach of the finger 19A. If the repeatable trajectory mentioned above is implemented under torque control, and the object 20 is located such that the inner phalange contacts first, then the outer phalange will continue to flex and the finger 19A will wrap around the object.

It should be understood that the asymmetry shown in FIG. 2 is not the only way to achieve a nonsingular tendon map matrix, R. If any of the four moment arms that are the entries in R is different while the other three are equal, then R will be nonsingular. More general choices of radii are also possible. The radii determine the slopes of the tendon constraint lines and thus affect the shape of the slack region and also determine which joint limits are stable. The embodiment shown is simple and has the desirable characteristic that the corresponding repeatable trajectory described above flexes the inner joint before the outer joint, which is useful for grasping motions.

Figure 4:
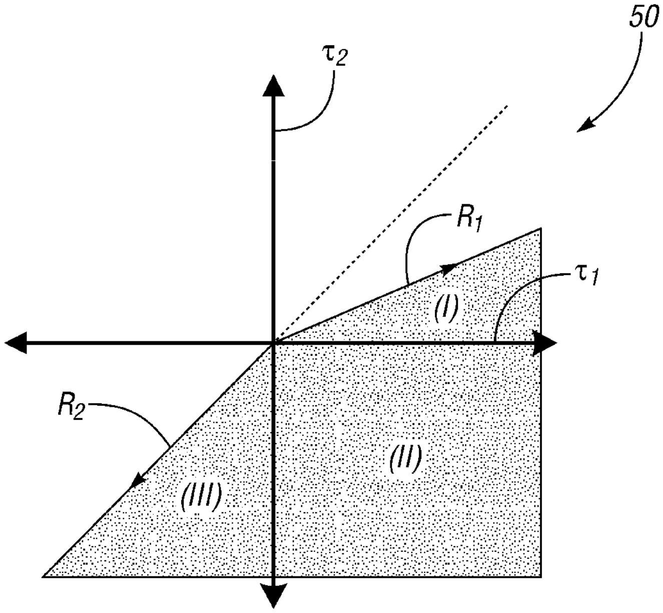
FIG. 4 is a vector diagram illustrating the space of possible joint torques of the finger shown in FIG. 2.

Referring to FIG. 4 in conjunction with the finger 19A of FIG. 2, the shaded region of vector diagram 50 represents the space of possible joint torques. Region (I) indicates when both joints are in flexion. Region (III) indicates when both joints are in extension. If $f_i$ represents the tension on tendon i, $f_i$ must be nonnegative. Since f is nonnegative, the space of possible joint torques corresponds to the span of the positive column vectors of R. Let $R_i$ represent the $i^{th}$ column vector of R. FIG. 3 shows the positive span of the two column vectors. Assume that $r_2$ is larger than $r_1$. It is appropriate to limit the operation of finger 19A to the condition that both joint torques have the same direction. In other words, joints 30, 32 are both in either flexion or extension. When joints 30, 32 are both in either flexion or extension, the behavior of finger 19A is designed for gripping. The regions of FIG. 4 that correspond to this condition are regions I and III. Hence in flexion, $\tau_2 \le (r_1/r_2)\tau_1$, while in extension, $\tau_2 \le \tau_1$.

Whereas $\tau$ can operate anywhere in the valid region, it can optionally be limited to operate along the principle vectors ($R_i$). The joint torques thus become parameterized by a single DOF. The principle vectors offer the advantage of being either both in flexion or both in extension. Such a control scheme, which may be enacted by controller 22 of FIG. 1, is well suited for hands 18 with secondary fingers 19A designed to assist primary fingers in gripping objects, e.g., the object 20 grasped by the hands 18 in FIG. 1. The secondary fingers 19A simply need to flexibly grip objects with a variable strength. Hence, one DOF is sufficient to either specify the grip strength or to fully extend the finger 19A. Note, the design of the finger should ensure this desirable behavior.

By introducing asymmetric joint radii and employing force control, an underactuated finger 19A can be fully controlled. The finger joints 30, 32 can achieve independent joint torques within a plausible range of solutions. The control can be further simplified by identifying a line in the control space that either flexes or extends both joints.

Using force control instead of position control to operate finger 19A eliminates the under-constrained "slop" in the finger posture of finger while allowing the finger to both flex and extend with variable force. The controller is able to convert commanded joint torques into calculated tendon tensions, and to control the actuators 90 to achieve the calculated tensions in the tendons, as set forth herein. This eliminates the unconstrained slack space that would otherwise exist in controlling only a position of the tendons. The control method also provides the performance and functionality required of a gripper finger. When the controller parameterizes the space of allowable joint torques with a single DOF that either fully extends or fully flexes the finger, a gripper finger is provided that can fully open or fully close with a variable strength. Finger 19A will either rest against its joint limits or wrap around an external object with joint torques scaled by a single parameter.

In this case, the finger 19A does not need asymmetric joint radii. Finger 19A, with equal joint radii, that is, with $r_2 = r_1$, can be effectively controlled in torque space using a reduced parameter space. With this idea of parameterizing the finger control, the finger 19A can be operated via desired behaviors, where for example, a command to close the finger would be translated by the controller 22 into appropriate tendon tensions based on the parameterized space.

While the best modes for carrying out the invention have been described in detail, those familiar with the art to which this invention relates will recognize various alternative designs and embodiments for practicing the invention within the scope of the appended claims.

The invention claimed is:

1. An underactuated tendon-driven finger for use within a robotic system having a total number of degrees of freedom (DOF) equal to at least n, and having a controller adapted for controlling an actuation of the tendon-driven finger via at least one actuator, the tendon-driven finger comprising:

n or fewer tendons and n DOF;

a plurality of tension sensors in communication with the n or fewer tendons; and at least two joints;

wherein the controller uses tension values of only the n or fewer tendons from the plurality of tension sensors to control the at least one actuator, and to convert commanded joint torques into appropriate calculated tendon tensions, thereby eliminating an unconstrained slack space that would otherwise exist in controlling only a position of the tendons.

2. The finger of claim 1, wherein the finger is characterized by an asymmetrical configuration in which at least one joint radius is different from the others, and wherein the controller utilizes the asymmetrical configuration in the force control of the tendons.

3. The finger of claim 2, wherein:

the controller parameterizes a space of joint torques wherein the at least two joints are both in either flexion or extension, as allowed by the asymmetric configuration; and independent torque commands are provided by the controller to the at least two joints within the space as allowed by the asymmetric configuration.

* * * * *